3,054,790
INTERMEDIATES AND PROCESS FOR THE PREPARATION OF 12α-HALOHYDROCORTISONE AND ESTERS THEREOF
Josef Fried, Princeton, and Patrick A. Diassi, Westfield, N.J., assignors to Olin Mathieson Chemical Corporation, New York, N.Y., a corporation of Virginia
No Drawing. Filed Nov. 20, 1959, Ser. No. 854,252
10 Claims. (Cl. 260—239.55)

This invention relates to, and has for its object the provision of an improved method for converting known steroids through a series of steps involving the preparation of new intermediates, to physiologically active steroidal final products.

This invention comprises the conversion of the known steroid 11β,12β-epoxyprogesterone by a series of steps involving the preparation of new intermediates to 12α-halohydrocortisone and esters thereof having the formula

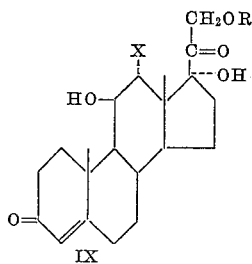

wherein X is a halogen (i.e., fluorine, chlorine, bromine and iodine) and R is hydrogen or the acyl radical of a hydrocarbon carboxylic acid of less than ten carbon atoms. Among the suitable carboxylic acids there may be named: the lower alkanoic acids (e.g., acetic, propionic, butyric and enanthic acids); the monocyclic aryl carboxylic acids (e.g., benzoic acid); the lower cycloalkanoic acids; the monocyclic aralkanoic acids (e.g., phenacetic acid); the lower alkenoic acids; and the lower cycloalkenoic acids.

More particularly, in accordance with the process of this invention 12α-halohydrocortisone and 21-esters thereof are prepared by a method which comprises treating 11β,12β-epoxyprogesterone with a diester of oxalic acid and an alkali metal lower-alkoxide, treating the resulting dienolate of the diester of 2,21-dioxalyl-11β,12β-epoxyprogesterone with bromine, rearranging and reducing the resulting brominated derivative to yield an ester of 11β,12β - oxido - $\Delta^{4,17(20)}$ - pregnadiene - 3 - one - 21 - oic acid, forming the 3-pyrrolidyl derivative thereof by reaction with pyrrolidine, reducing the 20-oate radical of the 3-pyrrolidyl derivative by the action of alkali metal aluminum hydride, treating the resulting 11β,12β-oxido-3-pyrrolidyl-$\Delta^{3,5,17(20)}$-pregnatriene-21-ol with a hydrolyzing agent to split off pyrrolidine and form 11β,12β-oxido-$\Delta^{4,17(20)}$ - pregnadene - 21 - ol - 3 - one, acylating the latter in the 21-position, oxidizing the 17(20)-unsaturation of the resulting 21-ester to introduce an hydroxyl group in the 17 position and a 20-keto group, treating the resulting 11β,12β - oxido - $\Delta^4$ -pregnene - 17α, - 21 - diol-3,20-dione-21-acylate with a hydrogen halide reagent selected from the group consisting of hydrogen fluoride, hydrogen chloride, hydrogen bromide and hydrogen iodide to yield 12α-halohydrocortisone 21-acylate and hydrolyzing the latter to obtain the compound 12α-halohydrocortisone.

The process of this invention can be followed easily by reference to the following equations and stepwise analysis:

CHART I

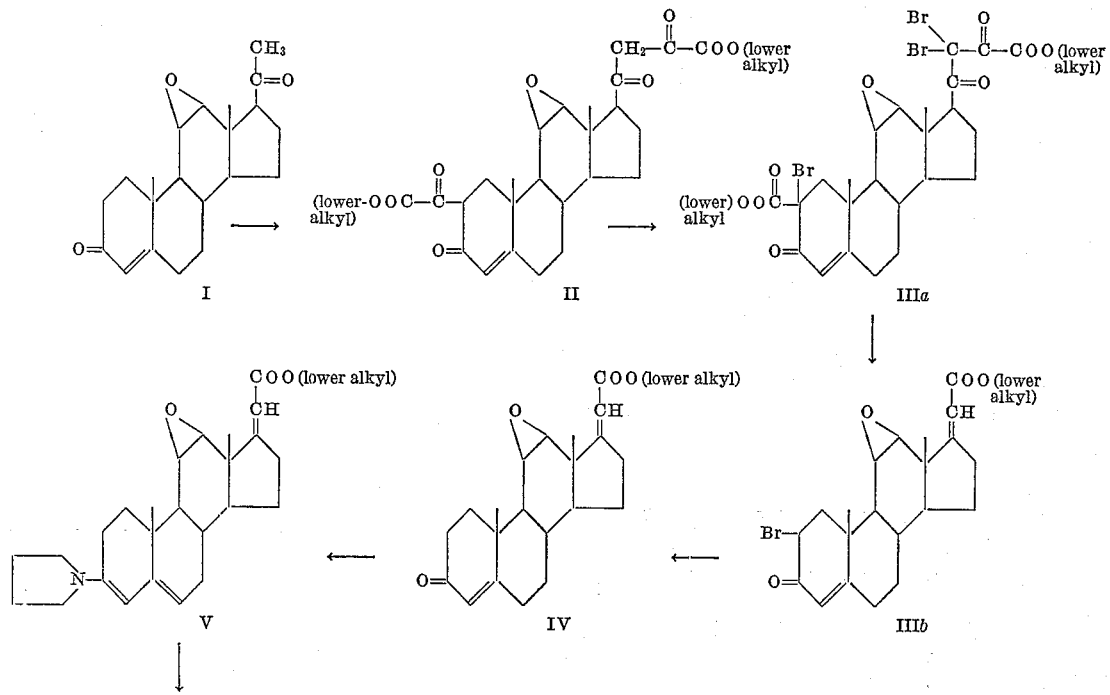

CHART I—Continued

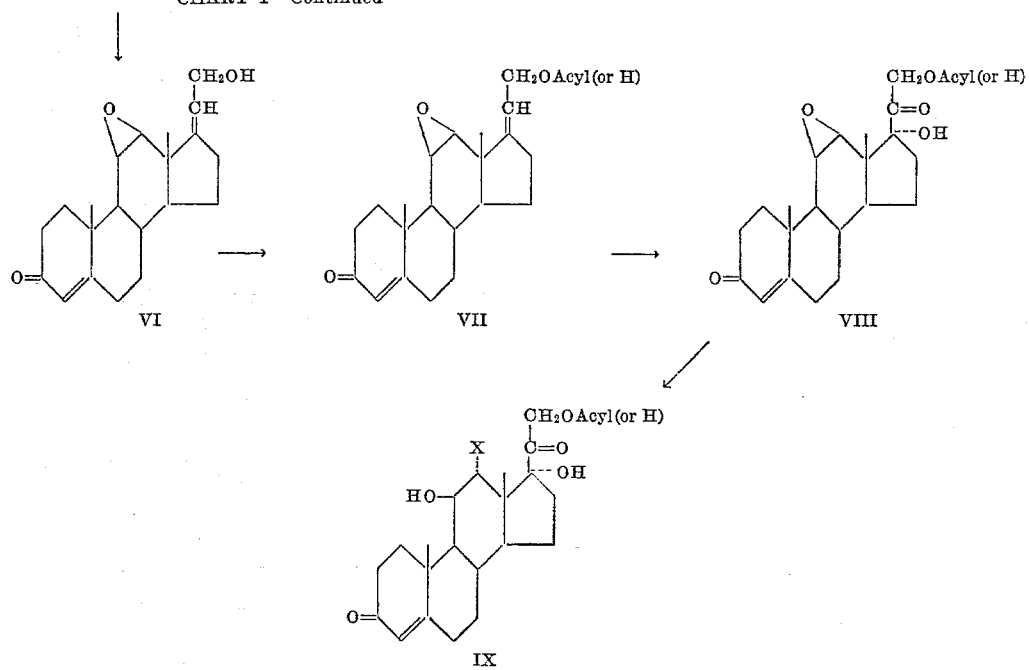

*Step I.—Preparation of 2,21-Di-(Lower Alkoxyoxalyl)-11β,12β-Oxidoprogesterone (II) and Sodium Dienolate Thereof*

Compound I, 11β,12β-epoxyprogesterone, is treated with a di-(lower alkyl)oxalate, e.g., diethyl oxalate and dimethyl oxalate, and sodium lower alkoxide, e.g., sodium methoxide, in a lower alkanol, to form the sodium dienolate of Compound II, which can be separated from the reaction mixture by precipitation by the addition of a solvent such as ether, in which the reaction product is insoluble. Compound II is obtained by neutralization (with an acid such as a mineral acid), of the disodium enolate. Upon neutralization, it precipitates and is collected by filtration and then dried.

*Step II.—Preparation of Brominated Products IIIa and IIIb*

The disodium enolate of Step I is treated at low temperatures with bromine in an anhydrous solvent. The bromine is added to the anhydrous steroid solution in a ratio of about three moles of bromine to each mole of the steroid, i.e., until the point at which the solution is no longer discolored. The solution of Compound IIIa thus prepared is flushed with nitrogen and treated as such with an alkali-metal lower alkoxide in lower alcoholic solution to effect the rearrangement to Compound IIIb which is separated from solution by precipitation with water, filtration and evaporation, in vacuo, to dryness.

*Step III.—Preparation of Methyl 11β,12β-Oxido-$\Delta^{4,17(20)}$-Pregnadiene-3-One-21-Oate (IV)*

Compound IIIb in a solution of an organic solvent is treated with a reducing agent such as zinc and acetic acid. The reaction mixture is filtered. The filtrate is evaporated to dryness and the residue is chromatographed on acid washed alumina, and the benzene soluble fraction evaporated to dryness to yield Compound IV.

*Step IV.—Preparation of Methyl 3-(N-Pyrrolidyl)-11β,12β-Oxido-$\Delta^{3,5,17,(20)}$-Pregnatriene-21-Oate (V)*

Compound IV is dissolved in an organic solvent and warmed at a moderate temperature with pyrrolidine. After a short time the reaction mixture is cooled and the resulting precipitate filtered off, washed and then dried to yield Compound V.

*Step V.—Preparation of 11β,12β-Oxido-$\Delta^{4,17,(20)}$-Pregnadiene-21-Ol-3-One (VI)*

Compound V is dissolved in an inert solvent (e.g., tetrahydrofuran) and reduced with an alkali metal aluminum hydride (e.g., lithium aluminum hydride). The blocking pyrrolidyl radical is then removed by hydrolysis. The reaction mixture is neutralized and evaporated to dryness to yield Compound VI.

*Step VI.—Preparation of 11β,12β-Oxido-$\Delta^{4,17(20)}$-Pregnadiene-21-Ol-3-One-21-Acylate (VII)*

Compound VI in anhydrous pyridine is treated with an acylating agent particularly an acid anhydride or an acid halide (particularly the chloride) of a hydrocarbon carboxylic acid of less than ten carbon atoms selected from the aforementioned group of acids, i.e., an acid chloride or anhydride correspondnig to R of Formula IX when R is acyl. The acylation mixture is evaporated in vacuo and the residue selectively dissolved in the organic phase of a two phase system of water and organic solvent, e.g., chloroform. The organic phase is washed and evaporated to a residue which may be further purified to yield Compound VII.

*Step VII.—Preparation of 11β,12β-Oxido - $\Delta^4$ - Pregnene-17α,21-Diol-3,20-Dione-21-Acylate (VIII)*

Compound VII is dissolved in an organic solvent under anhydrous conditions and then hydroxylated at the 17α, (20) unsaturation with a suitable hydroxylating reagent, among which there can be named osmium tetroxide and hydrogen peroxide in a solvent such as tertiary butanol. The residue, i.e., the partially deacylated derivative of Compound VIII, is recovered from the neutralized reaction mixture by solvent extraction and is obtained in dry form by evaporation under vacuo. It is then acylated by the action of pyridine with either an acid halide or anhydride as in Step VI to yield Compound VIII which can be recovered by extraction in a two phase aqueous system, acidification of the separated organic phase and evaporation to dryness.

*Step VIII.—Preparation of 12α-Halohydrocortisone-21-Ester (IX)*

Compound VIII is dissolved in a dry organic solvent, e.g., chloroform and/or tetrahydrofuran, which is inert to the action of dry hydrogen halide. The solution is cooled to below freezing temperatures and treated with a consisting of hydrogen fluoride, hydrogen bromide, hydrogen iodide and hydrogen chloride, thereby splitting the oxido radical and yielding 21-ester of 12α-halo-hydrocortisone. The thus prepared halohydrin i.e., the compound of Formula IX, is recovered from the neutralized reaction mixture by extraction, crystallization and evaporation in vacuo. It is readily converted to the free 21-ol with a reagent capable of hydrolyzing the 21-ester, such as dilute potassium carbonate, and the 21-ol readily recovered from the hydrolysis mixture by evaporation and recrystallization.

The compounds of Formula IX, disclosed in Serial No. 788,246, filed October 23, 1958, are physiologically active steroids which possess glucocorticoid as well as mineralocorticoid activity. Thus, they may be administered instead of and in the same manner as cortisone or hydrocortisone in the treatment of rheumatoid arthritis and dermatomyositis, or in the same manner as desoxycorticosterone in the treatment of Addison's disease or adrenal insufficiencies, the dosage for such administration being dependent on their relative activities.

The following examples are presented to further illustrate this invention.

EXAMPLE I

*Preparation of 2,21-Diethoxyoxalyl-11β,12β-Oxidoprogesterone (II) and Sodium Dienolate Thereof*

To a solution of 2.00 g. (6.09 mmols.) of 11β,12β-oxidoprogesterone in 250 ml. of dry benzene is added 6.1 ml. (40 mmols.) of diethyloxalate and 6.3 ml. (12.8 mmols.) of 2.04 N sodium methoxide in methanol. The mixture is stirred overnight at room temperature, and then 300 ml. of anhydrous ether is added. After stirring for 30 minutes the precipitated sodium dienolate of 2,21-diethoxyoxalyl - 11β,12β - oxidoprogesterone is filtered, washed with ether and dried. Yield: 3.42 g.

Neutralization of an aqueous solution of the sodium dienolate by dilute hydrochloric acid precipitates 2,21-diethyloxalyl-11β,12β-oxidoprogesterone which is collected by filtration, washed with water and dried.

EXAMPLE II

*Preparation of 2,21,21-Tribromo - 2,21 - Diethoxyoxalyl-11β,12β - Oxidoprogesterone (III) and Methyl 2-Bromo-11β,12β-Oxido-Δ$^{4,17,(20)}$ - Pregnadiene - 3 - One-21-Oate (IIIb)*

To a solution of 9.11 g. (15.9 mmols.) of the sodium enolate of 2,21-diethoxyoxalyl-11β,12β-oxidoprogesterone in 300 ml. of methanol, 1.8 ml. (31.8 mmols.) of glacial acetic acid and 4.90 g. (62 mmols.) of anhydrous sodium acetate is added. The solution is cooled to 0° C. in an ice bath and then titrated with a solution 7.5 g. (46.8 mmols.) of bromine in 75 ml. of methanol to produce 2,21,21-tribromo-2,21-diethoxyoxalyl - 11β,12β - oxidoprogesterone. The solution is then flushed with nitrogeen and 51.5 ml. (97.4 mmols.) of 1.89 N sodium methoxide in methanol is added and the mixture stirred under nitrogen at room temperature for 2½ hours. It is then poured into 1 l. of cold 1% sodium chloride solution. The precipitated methyl 2-bromo-11β,12β-oxido-Δ$^{4,17(20)}$ - pregnadiene - 3-one-21-oate is filtered, washed with water and dried.

EXAMPLE III

*Preparation of Methyl 11β,12β-Oxido - Δ$^{4,17(20)}$ - Pregnadiene-3-One-21-Oate (IV)*

To the residue of Example II, i.e., Compound III is added acetic acid (57 ml.) and zinc dust (3.8 g.) and the mixture is stirred at room temperature for an additional 40 minutes. It is filtered, the zinc washed with methanol and the combined filtrate and washings evaporated to dryness, in vacuo. The residue is distributed between 500 ml. each of chloroform and water. The chloroform is then washed successively with 5% NaHCO₃ and twice with water and evaporated to dryness in vacuo.

This residue (5.7 g.) is dissolved in 200 ml. of benzene hexane (1:1, v.:v.) and absorbed on 114 g. of acid washed alumina. Elution with benzene and benzene-containing 10% chloroform followed by evaporation of the solvents gives material which on crystallization from acetone-hexane yields 1.87 g. of methyl 11β,12β-oxido-Δ$^{4,17(20)}$-pregnadiene-3-one-21-oate of the following properties: M.P. about 169–171° C.; [α]$_D^{23}$+184 (chlf.);

$\lambda_{max.}^{EtOH}$ 235 mμ (ε=23,500); $\lambda_{max.}^{Nujol}$ 5.84, 6.01, 6.10 and 6.21μ

*Analysis.*—Calcd. for C₂₆H₃₆O₃N (409.55); C, 76.24; H, 8.61; N, 3.42. Found: C, 75.76; H, 8.67; N, 3.72.

EXAMPLE IV

*Preparation of Methyl 3-(N-Pyrrolidyl)-11β,12β-oxido-Δ$^{3,5,17(20)}$-Pregnatriene-21-Oate (V)*

To a solution of 119 mg. (0.336 mmols.) of methyl 11β,12β-oxido-Δ$^{4,17,(20)}$-pregnadiene-3-one-21-oate in 2 ml. of methanol is added 0.2 ml. of pyrrolidine, and the mixture is warmed under nitrogen for 5 minutes. On cooling, the crystalline methyl 3-(N-pyrrolidyl)-11β,12β-oxido-Δ$^{3,5,17(20)}$-pregnatriene-21-oate separates out. It is filtered, washed with a little cold methanol and dried. Melting point about 165–167° C.;

$\lambda_{max.}^{EtOH}$ 226 mμ (ε=16,600), 277 mμ (ε=18,300); $\lambda_{max.}^{Nujol}$ 5.92, 6.07, 6.15, 6.25, 12.13μ

EXAMPLE V

*Preparation of 11β,12β-Oxido-Δ$^{4,17(20)}$-Pregnadiene-21-ol-3-one (VI)*

To a solution of 1.78 g. (4.35 mmols.) of methyl 3-(N-pyrrolidyl) - 11β,12β - oxido - Δ$^{3,5,17(20)}$-pregnatriene-21-oate in 12 ml. of tetrahydrofuran, freshly distilled from lithium aluminum hydride, 140 mg. (3.57 mmols.) of lithium aluminum hydride is added and the reaction left at room temperature for 1 hour. Twenty-five milliliters of an acetic acid (4-ml.)-sodium acetate (4 g.) buffer in methanol (50 ml.) and water (10 ml.) are added and the mixture refluxed under nitrogen for 2 hours. After cooling the mixture is diluted with 100 ml. each of chloroform and water. The aqueous phase is acidified with 2 N HCl, the chloroform layer separated, washed successively with 5% NaHCO₃, twice with water and evaporated to dryness to yield 1.39 grams of Compound VI.

EXAMPLE VI

*Preparation of 11β,12β-Oxido-Δ$^{4,17(20)}$-Pregnadiene-21-ol-3-one-21-acetate (VII)*

The residue (1.39 g.) of Example V, i.e., Compound VI, is dissolved in 5 ml. of dry pyridine and 2 ml. of acetic anhydride protected from moisture and left overnight at room temperature. The reagents are then removed in vacuo and the residue distributed between chloroform and water. The chloroform layer is washed successively with dilute hydrochloric acid, 5% NaHCO₃, twice again with water and evaporated to dryness. Crystallization from acetone-hexane gives 800 mg. of 11β,12β-oxido-Δ$^{4,17(20)}$-pregnadiene-21-ol-3-one-21-acetate, having the following properties: M.P. about 178–181° C.; [α]$_D^{23}$+148° (chlf.);

$\lambda_{max.}^{EtOH}$ 238 mμ (ε=14,700); $\lambda_{max.}^{Nujol}$ 5.76, 5.99 and 6.19μ

*Analysis.*—Calcd. for C₂₃H₃₀O₄ (370.47): C, 74.56; H, 8.16. Found: C, 74.41; H, 8.37.

EXAMPLE VII

*Preparation of 11β,12β-Oxido-Δ$^4$-Pregnene-17α,21-diol-3,20 Dione-21-Acetate (VIII)*

To a solution of 298 mg. (0.804 mmols.) of 11β,12β-oxido-Δ$^{4,17(20)}$-pregnadiene-21-ol-3,20-dione 21-acetate in 15 ml. of dry tertiary butanol, there is added 0.2 ml. of pyridine and 0.7 ml. of a solution of osmium tetroxide in dry t-butanol (6 mg./ml.). While stirring, 2.3 ml. of a 0.875 M solution of hydrogen peroxide in dry t-butanol is added dropwise over a 10 minute period. The reaction is then left at room temperature for 4 hours during which time it first darkens and then lightens and finally becomes cloudy. Nitrogen is bubbled through the reaction mixture of 15 minutes and a solution of 300 mg. of sodium sulfite in 15 ml. of water, which previously also had been nitrogenated for 15 minutes, is added. After 5 minutes under nitrogen, the mixture is neutralized with 10% acetic acid and diluted with 100 ml. of water. It is then extracted with 100 ml. and 50 ml. portions of chloroform and the combined chloroform extracts are washed twice with water, dried over sodium sulfate and evaporated to dryness to give the deacylated derivative of VIII. The residue is dissolved in 5 ml. of pyridine and 2 ml. of acetic anhydride and left at room temperature overnight. The reagents are then removed in vacuo, and the residue distributed between chloroform and water. The chloroform extract is washed successively with 2 N HCl, 5% NaHCO$_3$, twice with water and then evaporated to dryness. The residue on crystallization from acetone-hexane gives 150 mg. of 11$\beta$,12$\beta$-oxido-$\Delta^4$-pregnene-17$\alpha$,21-diol-3,20-dione 21-acetate; M.P. about 245–247°;

$\lambda_{max.}^{EtOH}$ 238 m$\mu$ ($\epsilon$=10,000); $\lambda_{max.}^{Nujol}$ 2.95, 5.71, 5.79, 6.04 and 6.11$\mu$

*Analysis.*—Calcd. for C$_{23}$H$_{30}$O$_6$ (402.47): C, 68.63; H, 7.51. Found: C, 68.85; H, 7.61.

EXAMPLE VIII

*Preparation of 12$\alpha$ - Fluoro-$\Delta^4$-Pregnene-11$\beta$,17$\alpha$,21-triol-3,20-Dione-21-Acetate (12$\alpha$-Fluorohydrocortisone 21-Acetate) (IX) and Free 21-ol*

(a) 50 mgs. of 11$\beta$,12$\beta$-oxido-$\Delta^4$-pregnene-17$\alpha$,21-diol-3,20-dione-21-acetate are dissolved in a mixture of 5 ml. of chloroform and 2.5 ml. of dry tetrahydrofuran contained in a polyethylene bottle and the solution cooled to $-80°$ C. by means of an acetone-Dry Ice bath. To this there is pipetted slowly with stirring 2.0 ml. of hydrogen fluoride by means of a polyethylene pipette. The reaction mixture is maintained at $-80°$ for 10 minutes and then the acetone-Dry Ice bath is replaced by an ice-salt bath. The reaction temperature is maintained at $-10°$ of 6 hours. It is then pipetted into a stirred mixture of 50 ml. of chloroform and 50 ml. of ice water in a polyethylene beaker and carefully neutralized with sodium bicarbonate. The chloroform is separated, washed with water, dried over sodium sulfate and evaporated to dryness. Crystallization of the residue from acetone-hexane gives 17 mg. of 12$\alpha$-fluorohydrocortisone 21-acetate melting at about 228–229° C. and having $[\alpha]_D^{22}$ +106° (chlf.);

$\lambda_{max.}^{Nujol}$ 3.00, 5.75, 5.85 and 6.07$\mu$

*Analysis.*—Calcd. for C$_{23}$H$_{31}$O$_6$F (422.48): C, 65.39; H, 7.39. Found: C, 65.22; H, 7.27.

(b) *Preparation of 12$\alpha$-fluorohydrocortisone.*—To a solution of 17 mg. of 12$\alpha$-fluorohydrocortisone 21-acetate in 6 ml. of methanol (oxygen free) 0.9 ml. of 10% potassium carbonate is added and the mixture kept under nitrogen at room temperature for 30 minutes. It is then neutralized with dilute acetic acid, diluted with water and extracted with ethyl acetate. The ethyl acetate extracts are washed with water, dried over anhydrous sodium sulfate, filtered and evaporated to dryness. Crystallization of the residue from acetone-hexane gives 10 mg. of 12$\alpha$-fluorohydrocortisone.

EXAMPLE IX

*Preparation of 12$\alpha$-Chlorohydrocortisone 21-Acetate*

A solution of 20 mg. of 11$\beta$,12$\beta$-oxido-$\Delta^4$-pregnene-17$\alpha$,21-diol-3,20-dione 21-acetate in 5.0 ml. chloroform is cooled to 0° C. and to this there is added dropwise 0.8 ml. of a 0.51 N solution of hydrogen chloride in chloroform. After one hour at 0° the solution is diluted with water and neutralized with dilute sodium bicarbonate. The chloroform is separated, washed with water and evaporated to dryness. Crystallization of the residue from acetone-hexane gives 11.5 mg. of 12$\alpha$-chlorohydrocortisone acetate, M.P. (about) 255–256°, $[\alpha]_D^{23}$+120 (ethanol).

*Anal.*—Calcd. for C$_{23}$H$_{31}$O$_6$Cl (438.93): C, 62.93; H, 7.12. Found: C, 62.71; H, 7.16.

EXAMPLE X

*Preparation of 12$\alpha$-Chlorohydrocortisone*

20 mgs. of 12$\alpha$-chlorohydrocortisone 21-acetate are suspended in 2 ml. of 0.27 N perchloric acid in methanol and the mixture shaken overnight at room temperature during which time the compound dissolves. The solution is neutralized with dilute sodium bicarbonate and then diluted with water. The crystals which separate are filtered, washed with water and dried to give 10 mg. of 12$\alpha$-chlorohydrocortisone.

The invention may be variously embodied within the scope of the appended claims.

What is claimed is:

1. 2$\beta$,21-di-(lower alkoxyoxalyl)-11$\beta$,12$\beta$-oxidoprogesterone.

2. The dialkali metal-dienolate of 2,21-di-(lower alkoxyoxalyl)-11$\beta$,12$\beta$-oxidoprogesterone.

3. 2$\beta$,21,21-tribromo-2,21-di-(lower alkoxyoxalyl)-11$\beta$, 12$\beta$-oxidoprogesterone.

4. Lower alkyl 2$\beta$-bromo-11$\beta$,12$\beta$-oxido-$\Delta^{4,17(20)}$-pregnadiene-3-one-21-oate.

5. Lower alkyl 11$\beta$,12$\beta$-oxido-$\Delta^{4,17(20)}$-pregnadiene-3-one-21-oate.

6. Lower alkyl 3-(N-pyrrolidyl)-11$\beta$,12$\beta$-oxido-$\Delta^{3,5,17(20)}$-pregnatriene-21-oate.

7. 11$\beta$,12$\beta$-oxido-$\Delta^{4,17(20)}$-pregnadiene-21-ol-3-one.

8. 11$\beta$,12$\beta$-oxido-$\Delta^{4,17(20)}$-pregnadiene - 21-ol-3-one-21-acylate wherein the acyl radical is the acid radical of a hydrocarbon carboxylic acid of less than ten carbon atoms.

9. The process for the preparation of the compound of claim 6 which comprises treating the compound of claim 5 with pyrrolidine.

10. The process for the preparation of a compound of claim 8 which comprises reducing the 3-pyrrolidyl derivative of claim 6 with an alkali metal aluminum hydride to form the corresponding 21-ol, treating the latter with an acidic hydrolyzing agent to split off pyrrolidine and recovering the 11$\beta$,12$\beta$-oxido-$\Delta^{4,17(20)}$-pregnadiene-21-ol-3-one thus formed.

References Cited in the file of this patent

UNITED STATES PATENTS

| | | |
|---|---|---|
| 2,790,814 | Hogg et al. | Apr. 30, 1957 |
| 2,809,967 | Poos et al. | Oct. 15, 1957 |

OTHER REFERENCES

Herz et al. Journal of American Chemical Soc., vol. 78 (1956), pages 2017–18 relied on.